United States Patent
Seward et al.

(10) Patent No.: US 9,826,087 B2
(45) Date of Patent: Nov. 21, 2017

(54) ORIGINATING A VOICE CALL FROM A SELECTED NUMBER USING A TEMPORARY ROUTING NUMBER

(71) Applicant: T-Mobile USA, Inc., Bellevue, WA (US)

(72) Inventors: Shelby Seward, Bellevue, WA (US); Robert F. Piscopo, Jr., Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/816,461

(22) Filed: Aug. 3, 2015

(65) Prior Publication Data

US 2017/0041460 A1 Feb. 9, 2017

(51) Int. Cl.
*H04M 1/66* (2006.01)
*H04M 3/42* (2006.01)
(Continued)

(52) U.S. Cl.
CPC ... *H04M 3/42008* (2013.01); *H04M 1/72583* (2013.01); *H04W 8/26* (2013.01);
(Continued)

(58) Field of Classification Search
CPC .................................................. H04W 12/06
(Continued)

(56) References Cited

U.S. PATENT DOCUMENTS 5,802,160 A  9/1998  Kugell et al.
8,315,613 B1  11/2012  Rahman et al.
(Continued)

FOREIGN PATENT DOCUMENTS

KR  1020050018723  2/2005
KR  1020060056051  5/2006
(Continued)

OTHER PUBLICATIONS

"Can I get Multiple Google Voice Numbers to one Phone?", retrieved Mar. 20, 2015 at http://www.quora.com/Can-I-get-multiple-Google-Voice-numbers-to-one-phone?share=1, 4 pgs.
(Continued)

*Primary Examiner* — Charles Shedrick
(74) *Attorney, Agent, or Firm* — Lee & Hayes, PLLC

(57) ABSTRACT

When authorized, a user of a computing device, such as a smart phone, may select an originating phone number to initiate a voice call that is different from the telephone number that is assigned to the computing device. The telephone number that is selected as the originating number may be a number that is assigned to another computing device and/or a different user. In response to receiving a request to place an outgoing call using the selected destination number, the network returns a temporary routing number to the computing device. The computing device places a call to the temporary routing number. After receiving the call at the temporary routing number, the network places the outgoing call using the selected originating number. The outgoing call appears to a called party to originate from the selected originating number instead of from the phone number assigned to the computing device.

19 Claims, 4 Drawing Sheets

(51) Int. Cl.

| | | |
|---|---|---|
| *H04W 12/06* | (2009.01) | |
| *H04W 8/26* | (2009.01) | |
| *H04W 40/02* | (2009.01) | |
| *H04M 1/725* | (2006.01) | |
| *H04M 3/38* | (2006.01) | |

(52) U.S. Cl.
CPC ........... *H04W 12/06* (2013.01); *H04W 40/02* (2013.01); *H04M 3/38* (2013.01); *H04M 2203/152* (2013.01); *H04M 2203/6081* (2013.01)

(58) Field of Classification Search
USPC ............................... 455/432.1; 370/352, 328
See application file for complete search history.

(56) References Cited

U.S. PATENT DOCUMENTS

| | | | |
|---|---|---|---|
| 9,729,702 | B2 | 8/2017 | Seward et al. |
| 2003/0125072 | A1 | 7/2003 | Dent |
| 2004/0120552 | A1* | 6/2004 | Borngraber ........ G07C 9/00158 382/115 |
| 2005/0075106 | A1 | 4/2005 | Jiang |
| 2006/0089140 | A1 | 4/2006 | Zhang |
| 2006/0094451 | A1 | 5/2006 | Lee |
| 2006/0105766 | A1* | 5/2006 | Azada ................. H04W 48/18 455/432.1 |
| 2006/0280169 | A1* | 12/2006 | Mahdi ................. H04M 7/1285 370/352 |
| 2007/0167158 | A1 | 7/2007 | Ajjannavar et al. |
| 2007/0206573 | A1 | 9/2007 | Silver |
| 2008/0043957 | A1 | 2/2008 | Guo |
| 2009/0061872 | A1 | 3/2009 | Hicks |
| 2010/0098057 | A1 | 4/2010 | Stewart |
| 2010/0291913 | A1 | 11/2010 | Xu |
| 2011/0045806 | A1 | 2/2011 | Gupta et al. |
| 2011/0061008 | A1 | 3/2011 | Gupta et al. |
| 2011/0163848 | A1 | 7/2011 | Shibata |
| 2011/0294472 | A1 | 12/2011 | Bramwell et al. |
| 2012/0033610 | A1* | 2/2012 | Ring ..................... H04L 67/141 370/328 |
| 2012/0099719 | A1 | 4/2012 | Erb |
| 2012/0290638 | A1 | 11/2012 | Narula et al. |
| 2013/0065567 | A1 | 3/2013 | Cui et al. |
| 2013/0157614 | A1 | 6/2013 | Al-Zaben |
| 2013/0288657 | A1 | 10/2013 | Huang |
| 2014/0052793 | A1 | 2/2014 | John et al. |
| 2015/0215459 | A1 | 7/2015 | Kirchhoff et al. |
| 2015/0244862 | A1 | 8/2015 | Salazar et al. |
| 2016/0337513 | A1 | 11/2016 | Seward et al. |
| 2016/0337825 | A1 | 11/2016 | Piscopo, Jr. et al. |
| 2017/0078484 | A1 | 3/2017 | Seward et al. |

FOREIGN PATENT DOCUMENTS

| | | |
|---|---|---|
| KR | 1020070060616 | 6/2007 |
| KR | 1020070074291 | 7/2007 |
| KR | 1020100113664 | 10/2010 |
| KR | 1020120058203 | 6/2012 |
| KR | 1020130140332 | 12/2013 |
| WO | WO02089510 | 11/2002 |
| WO | WO2006085303 | 8/2006 |

OTHER PUBLICATIONS

Garcia-Martin et al, "Private Header (P-Header) Extensions to the Session Initiation Protocol (SIP) for the 3rd Generation Partnership Project (3GPP)", Jan. 2003, Network Working Group, RFC 3455, 34 pages.

Summerson, "Goggle Voice Now Lets You Have Multiple Numbers on One Account-for-a-Fee", Jun. 2011, retrieved Mar. 20, 2015 at www.androidpolice.com/2011/06/10/google-voice-now-lets-you-have-multiple-numbers-on-one-account-for-a-fee/, 4 pgs.

Office action for U.S. Appl. No. 14/710,861 dated Mar. 24, 2016, Piscopo Jr. et al., "Routing Multiple Numbers for One Telecommunications Device", 10 pages.

Office action for U.S. Appl. No. 14/710,812, dated Apr. 5, 2016, Seward et al., "Client Application Enabling Multiple Line Call Termination and Origination", 15 pages.

PCT Search Report and Written Opinion dated Dec. 20, 2016 for PCT Application No. PCT/US16/50540, 13 pages.

Office action for U.S. Appl. No. 14/854,492, dated Oct. 21, 2016, Seward et al., "Communication Termination Using Hunt Groups and Implicit Registration", 12 pages.

Office action for U.S. Appl. No. 14/710,861 dated Sep. 28, 2016, Piscopo Jr. et al., "Routing Multiple Numbers for One Telecommunications Device", 6 pages.

Office action for U.S. Appl. No. 14/710,812, dated Sep. 28, 2016, Seward et al., "Client Application Enabling Multiple Line Call Termination and Origination", 17 pages.

PCT Search Report and Written Opinion dated Oct. 20, 2016 for PCT Application No. PCT/US16/42841, 10 pages.

Office action for U.S. Appl. No. 14/854,492 dated Mar. 30, 2017, Seward et al., "Communication Termination Using Hunt Groups and Implicit Registration", 15 pages.

Office action for U.S. Appl. No. 14/710,861 dated Mar. 8, 2017, Piscopo Jr. et al., "Routing Multiple Numbers for One Telecommunications Device", 7 pages.

The PCT Search Report and Written Opinion dated Jul. 27, 2016 for PCT application No. PCT/US2016/031793, 11 pages.

The PCT Search Report and Written Opinion dated Aug. 3, 2016 for PCT application No. PCT/US2016/029188, 14 pages.

Office action for U.S. Appl. No. 14/854,492, dated Jul. 21, 2017, Seward et al., "Communication Termination Using Hunt Groups and Implicit Registration", 13 pages.

Office Action for U.S. Appl. No. 14/710,812, dated Sep. 12, 2017, Seward, "Client Application Enabling Multiple Line Call Termination and Origination", 11 pages.

* cited by examiner

ORIGINATING A VOICE CALL FROM A SELECTED NUMBER USING A TEMPORARY ROUTING NUMBER

BACKGROUND

A computing device, such as a wireless phone, that is capable of terminating (e.g., receiving) or originating phone calls is typically associated with a particular phone number. The computing device can originate phone calls whose calling number is the particular phone number. In some cases, a person may carry multiple computing devices in order to have the use of different phone numbers. Not only is this cumbersome for the user, but wasteful because the user has to acquire multiple computing devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
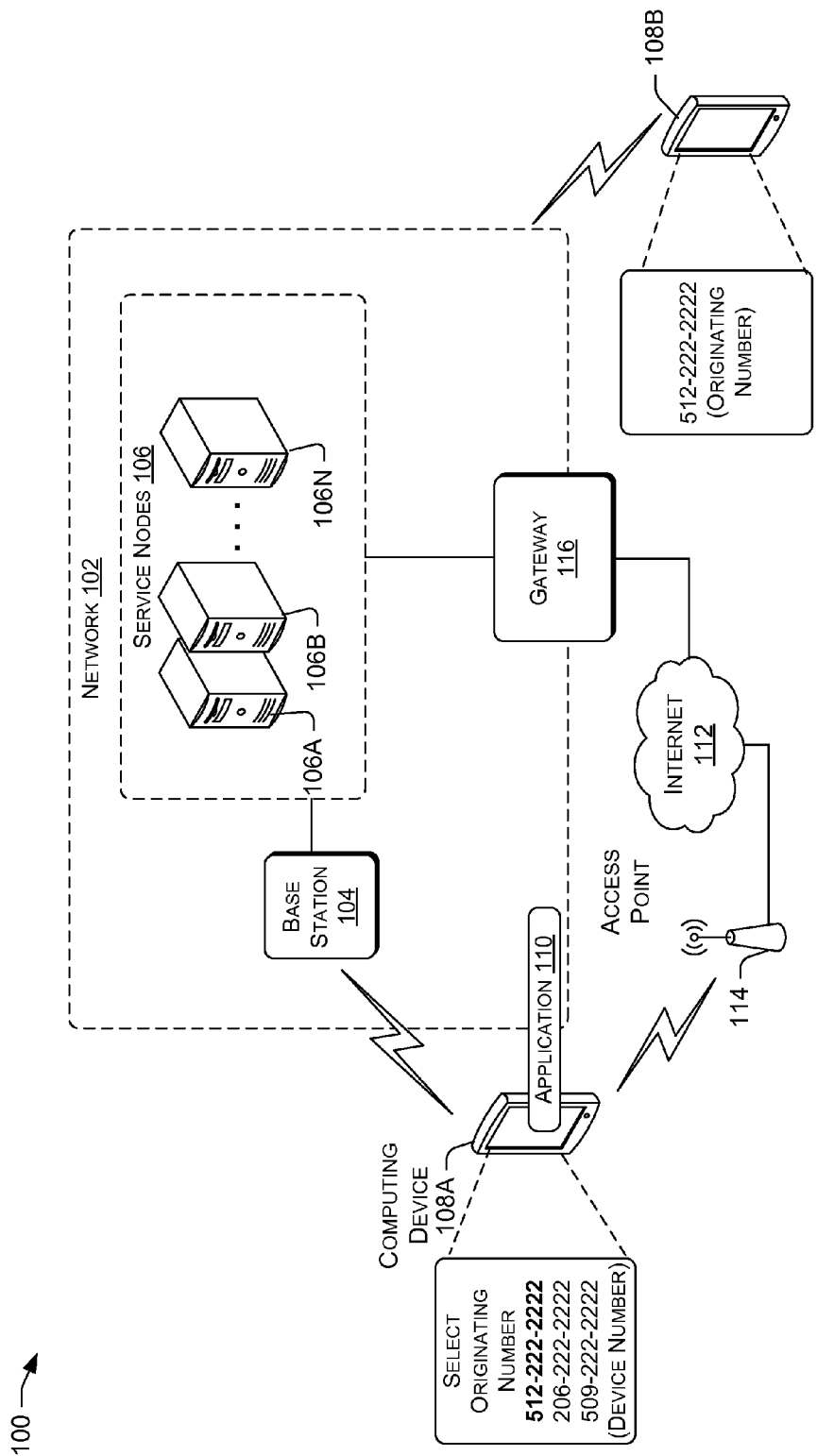
FIG. 1 is a block diagram illustrating an environment for originating a voice call from a selected number using a temporary routing number provided by a network associated with a wireless service provider.

Described herein are techniques and systems for originating a voice call from a selected number using a temporary routing number. When authorized, a user of a computing device, such as a smart phone, may select an originating phone number to initiate a voice call that is different from the telephone number that is assigned to the computing device. In some examples, the telephone number that is selected as the originating number may be a number that is assigned to another computing device and/or a different user.

When a user acquires (e.g., purchases, leases, etc.) a computing device, such as a wireless phone, the wireless service provider (e.g., a carrier, such as T-Mobile®) may assign an International Mobile Subscriber Identity (IMSI) and/or an E.164 address (e.g., up to a fifteen digit telephone number) that is specific for the user associated with the computing device. As used herein, a "device number" is the E.164 address or identity assigned to the computing device by the wireless service provider.

In some configurations, the wireless service provider may include, or otherwise provide, a telephony client software application that can be installed on the computing device associated with the user. In some examples, the user may install the telephony client on other computing devices that may also be used to place calls. Using techniques described herein, a user may place an outgoing call that is originated from a number that is different from the device number that is assigned to the computing device. For example, the telephony client may be used by the user to select a telephone number that the call is to originate from (the "originating number"). The term "call" as used herein refers to a voice call (e.g., where the user desires to speak to another human being). For instance, a user may select one number as the originating number for calls made for business, and another number for calls made for personal use.

In some configurations, a user might authorize another user, or a group of users, to use a telephone number that is assigned to the user. For instance, a business owner might allow employees of the business to use a business number when making calls from their personal computing device. According to some configurations, the user might use a graphical user interface (GUI), such as the telephony client, or some other interface, to authorize other users to use (e.g., as an originating number) a telephone number that is assigned to the user. After a user is authorized to use a telephone number as an originating number, the user might use to the telephony client to select the telephone number to use as the originating number in an outgoing call.

After selecting the telephone number to use as the originating number and specifying the destination number (e.g., the receiver or destination of the call), the computing device signals a network associated with the wireless service provider to place the call. For instance, a message may be sent by the computing device to the network that includes the specified originating number and the destination number.

In response to receiving the communication from the computing device, the network may authenticate the user (or the computing device) to ensure that the user is authorized to initiate a call using the specified number as the originating number. After authentication, the network returns a routing number to the computing device that is used by the computing device when placing the outgoing call. In some examples, the routing number is a temporary routing number (TRN) provided by the home network of the subscriber that is used by the computing device to initiate the call. According to some configurations, the network may store the temporary routing number provided to the computing device along with other information related to the desired outgoing call (e.g., the destination number, and the originating number).

After receiving the temporary routing number, the computing device places an outbound call to the temporary routing number. In some configurations, the telephony application on the computing device places the outbound call. The network receives the call made to the temporary routing number and may authenticate that the user and/or the computing device is authorized to place the outgoing call. For example, a network component may authenticate that the computing device making the call to the TRN was the computing device that was provided with the TRN.

The network component may also determine the originating number to use to place the outgoing call as well as the destination number to call from the originating number. In some cases, the network may query a database, or some other data store or memory, to determine the selected originating number and the destination number. In other examples, the originating number and the destination number may be included in information received by the network from the computing device.

Using the originating number specified by the user, the network may initiate the call to the destination number. The temporary routing number may then be provided to other computing devices by the network to place outgoing calls. For example, after the call is connected between the computing device and the destination, the TRN may be made available to other users. Instead of placing all calls from a device using a single telephone number (the device number), any telephone number that the user is authorized to use may be selected as the originating number.

As such, the called party may view the call as being originated by the selected originating number even though the call was originated by a device having a different device number. Thus, the user may originate an outgoing call from the computing device where the outgoing call appears to have originated from a different number than a phone number associated with the computing device (and different from the device number associated with the user's wireless phone). More details are provided below with regard to FIGS. 1-4.

FIG. 1 is a block diagram showing an illustrative environment 100 for originating a voice call from a selected number using a temporary routing number provided by a network associated with a wireless service provider. The environment 100 may include a network 102 that is operated by a wireless service provider. The environment 100 is illustrated in simplified form and may include many more components.

The network 102 may include one or more base stations 104 and one or more service nodes 106. A base station 104 may handle traffic and signals between electronic devices, such as the computing devices 108A and 108B, and a core network of the network 102. For example, the base station 104 may perform the transcoding of speech channels, allocation of radio channels to electronic device, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the core network of the network 102. In some examples, the base station 104 may be configured as a Node B or an evolved Node B (eNodeB) that may be utilized in an LTE network. In some configurations, a NodeB may use the UMTS Terrestrial Radio Access (UTRA) protocols Wideband Code Division Multiple Access (WCDMA) or Time Division Synchronous Code Division Multiple Access (TD-SCDMA) on its air interface. In other configurations, an eNodeB may use extended UTRA (E-UTRA) protocols Orthogonal Frequency-Division Multiple Access (OFDMA) and Single-carrier frequency-division multiple access (SC-FDMA) on its air interface for LTE.

The core network may be responsible for routing voice communication to other networks, as well as routing data communication to external packet switched networks, such as the Internet. For example, the one or more service nodes 106 may be a Gateway GPRS Support Node (GGSN), a mobility management entity (MME), a home subscriber server (HSS), a packet gateway (P-GW), an Authentication, Authorization, and Accounting component (AAA), a gateway such as an ePDG, a multimedia resource function control (MRFC), a multimedia resource function processor (MRFP), a proxy CSCF (P-CSCF), an interrogating CSCF (I-CSCF), and the like, or other nodes. The computing device 108 may be a smart phone, a personal digital assistant, a netbook, a laptop computer, and/or another electronic that is capable of sending or receiving voice or data via the network 102 and/or a Wi-Fi network.

In some configurations, one or more of the service nodes 106 may be configured as an application server that provides support for one more applications, such as application 110.

While the service nodes 106 are illustrated within the network 102, one or more other computing devices may be located outside of the network 102. For example, an application server, or some other server or device, may be connected to the network 102 via one or more external packet switched networks, such as the Internet.

As briefly discussed above, a telephony client application, such as application 110, on the computing device 108 may establish data communication with the network 102 through a data connection to the base station 104. The base station 104 may route a communication from the communication device 108 through the core network via the service nodes 106. In such instances, the service nodes 106 may be capable of performing subscriber profile insertion with respect to data traffic between the application 110 on the computing device 108 and the application server.

For example, the application 110 may be a calling application that is requesting to place an outgoing call to a destination number using a selected number as the originating number. In the current example, the user has selected the number "512-222-2222" to use as the originating number. The selected number is different from the destination number "509-222-2222" of the computing device 108A. After selecting the originating number and a destination number, the computing device 108A may send a request to the network 102 to place the outgoing call.

The service nodes 106 may authenticate that the computing device 108 is authorized to use the selected originating number. For example, one or more of the service nodes 106 may identify the computing device 108 by a unique identifier of the computing device 108 (e.g., the IMSI or the E.164 address). In turn, the service nodes 106 may retrieve a profile that corresponds to the IMSI. The profile may include information specifying the numbers that the computing device and/or the user of the computing device 108 is authorized to use as an originating number. Accordingly, when a call request arrives at the network 102, the service nodes 106 may verify that the information in the profile corresponds to a valid request. When the user is authenticated, the service nodes 106 may transmit a temporary routing number back to the application 110 via the network 102 or the Internet 112.

According to some configurations, the application 110 on the computing device 108 may connect to the service nodes 106, or some other component such as an application server, via the Internet 112 or some other network, such as a private network. In such instances, the application 110 may connect to the Internet 112 via Wi-Fi access point 114. Accordingly, data traffic from the application 110 may be routed to the service nodes 106 by the gateway 116 of the network 102.

In either case, after receiving the temporary routing number, the computing device 108 places an outbound call to the temporary routing number. In some configurations, the application 110 on the computing device 108 places the outbound call to the temporary number. The network 102 receives the call made to the temporary routing number and may authenticate the user and/or the computing device. For example, the service nodes 106 may authenticate that the computing device 108 making the call to the TRN was the computing device 108 that was provided with the TRN by the network 102. In some examples, the service nodes 106 may determine an amount of time it took before receiving a call directed to the TRN after providing the TRN to the computing device 108A. In some cases, when the time exceeds a predetermined threshold (e.g., 1 second, 5 seconds, one minute), the service nodes may not authorize the outgoing call to be placed using the selected originating number.

The service nodes 106 may also determine the originating number to use (as specified by the user) to place the outgoing call as well as to determine the destination number to call. In some cases, the service nodes 106 may query a database, or some other data store or memory, to determine the selected originating number and the destination number. In other examples, the originating number and the destination number may be included in information received by the network from the computing device.

Using the selected originating number, the network 102 may initiate the call to the destination number using the desired originating number specified by the user. For example, the destination number may be associated with the computing device 108B. As illustrated, the display of the computing device 108B shows that the originating number is "512-222-2222" that was selected by the user of the computing device 108A. In the current example, the device number of the computing device 108A is "509-222-2222" and not the selected originating number of "512-222-2222". As such, the called party may view the call as being originated by the selected originating number even though the call was originated by a device in which the telephony client application 110 was installed.

After placing the call, and possibly after connecting the call, the service nodes 106 may release the temporary routing number. Releasing the TRN allows the TRN to be provided to other computing devices by the network to place outgoing calls.

Figure 2:
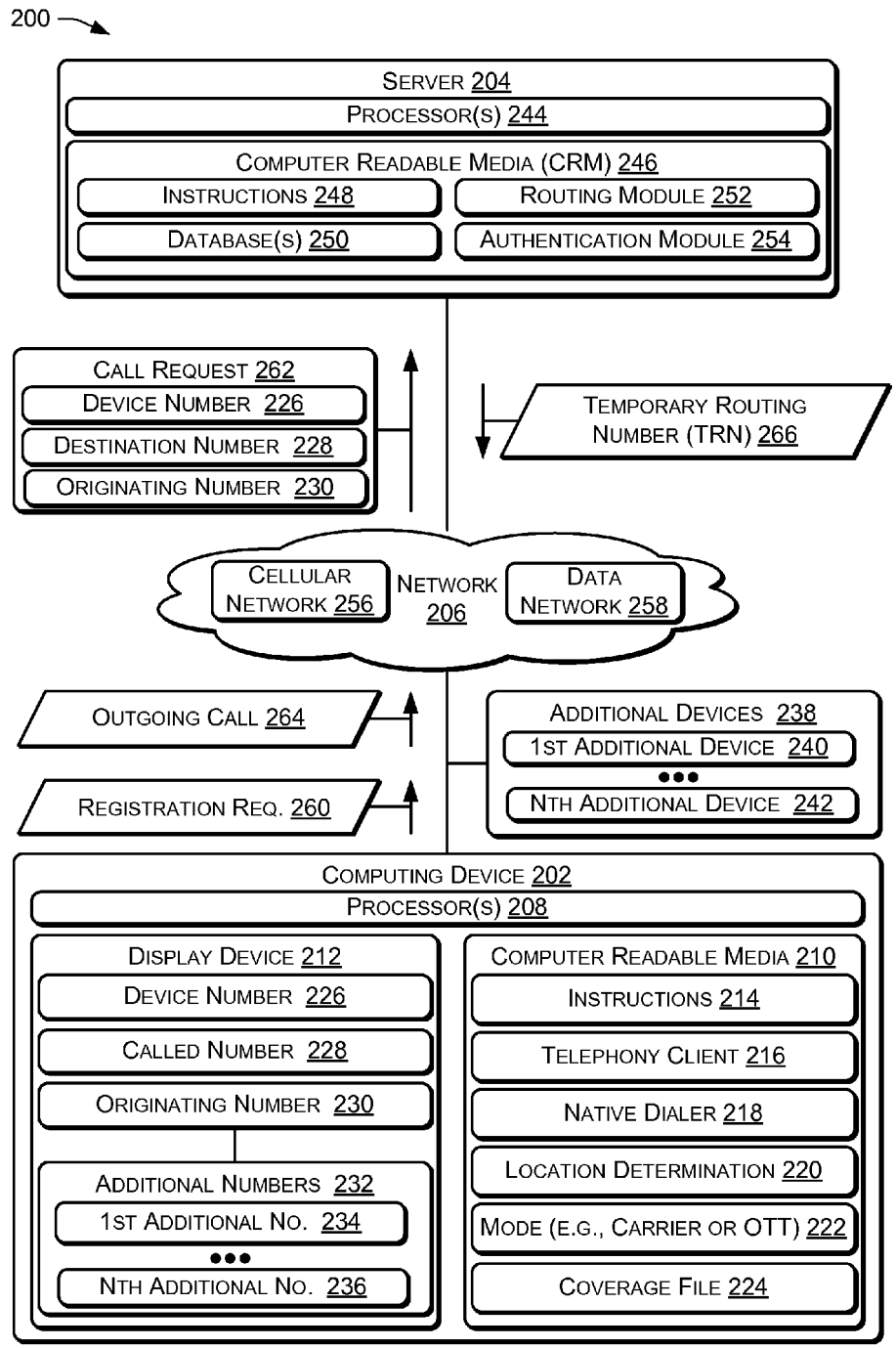
FIG. 2 is a block diagram illustrating a system that includes a telephony client application for originating a voice call from a selected number using a temporary routing number.

FIG. 2 is a block diagram illustrating a system 200 that includes a telephony client application for originating a voice call from a selected number using a temporary routing number according to some implementations. The system 200 includes a computing device 202 coupled to a server 204 via a network 206. The computing device 202 may be configured similarly to the computing device 108. Similarly, the network 206 may be the same network as network 102 illustrated in FIG. 1.

The computing device 202 may be a wireless phone, a tablet computer, a laptop computer, a wristwatch, or other type of computing device. The computing device may include one or more processors 208 and computer readable media, such as memory (e.g., random access memory (RAM), solid state drives (SSDs), or the like), disk drives (e.g., platter-based hard drives), another type of computer-readable media, or any combination thereof.

The computer readable media 210 may be used to store instructions to perform various functions and to store data. For example, the computer readable media 210 may include instructions 214, a telephony client 216, a native dialer 218, a location determination module 220, a current mode 222 of operation, and a coverage file 224. Of course, the computer readable media 210 may also include other types of instructions and data, such as an operating system, device drivers, etc. The telephony client 216 may enable a user to select a phone number that is used as the originating number of call to a destination phone number. For instance, the telephony client 216 may be used by a user to select an originating number from other phone numbers in addition to the phone number associated with the user's wireless phone.

Non-transitory computer-readable media may include volatile and nonvolatile, removable and non-removable tangible, physical media implemented in technology for storage of information, such as computer readable instructions, data structures, program modules, or other data. System memory, removable storage and non-removable storage are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device. Any such non-transitory computer-readable media may be part of the computing device.

The native dialer 218 (also known as a mobile dialer) may be an application that enables calls to be originated via Voice over Internet Protocol (VoIP) using Session Initiation Protocol (SIP) signaling. The location determination module 220 may determine a current location of the computing device 202. For example, the location determination module 220 may determine the current location using the Global Positioning System (GPS). The current location as determined by the location determination module 220 may determine the mode 222. For example, if the current location of the computing device 202 is within a geographic area in which a carrier, associated with a device number 226 of the computing device 202, provides coverage, then the mode 222 may be set to carrier mode. If the current location of the computing device 202 is in a geographic area in which the carrier does not provide coverage (e.g., a location in which a wireless phone associated with the device number 226 would normally roam), then the mode 222 may be set to Over-The-Top (OTT) mode.

The display device 212 may be separate from the computing device 202 or integrated (e.g., as illustrated in FIG. 2) with the computing device 202. The display device 212 may display various information associated with originating a call. For example, the display device 212 may display one or more of the device number 226, or other numbers that are authorized to be used as an originating number 230 that is selected from one of the additional numbers 232. The device number 226 may be an identifier (e.g., IMSI or E.264 address) that is associated with the user's wireless phone used to route incoming and outgoing call. For example, when the computing device 202 is the user's wireless phone, the device number 226 may be the phone number associated with the user's wireless phone. In addition to being used as a conventional 10 digit phone number, the device number 226 may also be used as a Uniform Resource Identifier (URI), e.g., as an Internet Protocol (IP) Multimedia Private Identity (IMPU), a unique permanently allocated global identity assigned by a home network operator (e.g., the carrier).

The destination number 228 may be the number of another user to call. In other words, the destination number 228 is the location to which the call is routed. As discussed herein, the originating number 230 to associate with an outgoing call may be selected by a user. By default, the originating number 230 may be the device number 226. The user may override this default by selecting the originating number 230 from one of the additional numbers 232. For example, the additional numbers 232 may include a first number 234 through to an Nth additional number (N>0).

The additional numbers 232 may include numbers that are authorized to be utilized by the user. For example, the user might be authorized to use numbers associated with (i) family members of a user of the computing device 202, (ii) businesses (or other activities) associated with the user of the computing device 202, (iii) friends, or all or some combination of (i), (ii), and (iii). The additional numbers 232 may be associated with additional devices 238. For example, the first additional number 234 may be associated with a first additional device 240 and the Nth additional number 236 may be associated with an Nth additional device 242.

The server 204 may include one or more processors 244 and one or more computer readable media 246. The computer readable media 246 may be used to store instructions 248, one or more databases 250, a routing module 252, and an authentication module 254. The instructions 248 may be executed by the processors 244 to perform the various functions described herein. The databases 250 may include a database storing information, such as which additional numbers are associated with a device number, etc. The routing module 252 may be used to setup and route calls from the computing device 202 in which the originating number 230 is different from the device number 226.

The authentication module 254 may perform various types of authentication, including determining whether the user associated with the device number 226 is authorized to originate calls from the additional numbers 232. For example, the authentication module 254 may be used to authenticate that a user is authorized to use a selected outgoing number. The authentication module 254 may also be used to determine whether a computing device attempting to make an outgoing call is authorized to use the selected originating number 130.

The network 206 may include one or more networks, such as a cellular network 256 and a data network 258. The cellular network 256 may provide wide-area wireless coverage using a technology such as Global System for Mobile (GSM), Code Division Multiple Access (CDMA), Universal Mobile Telephone Service (UMTS), a Universal Terrestrial Radio Access Network (UTRAN), an evolved UTRAN network (E-UTRAN) (e.g., Long Term Evolution (LTE), a Global System for Mobile communication (GSM) EDGE Radio Access Network (GERAN), a voice over LTE (VoLTE), or some other type of network. While communications between the cellular network 256 and computing devices (e.g., the computing device 202) may be performed using a wide-area wireless network, the cellular network 256 may include other technologies, such as wired (Plain Old Telephone Service (POTS) lines), optical (e.g., Synchronous Optical NETwork (SONET) technologies, and the like.

The data network 258 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), LTE, and the like. The data packets may be used to carry voice traffic using VoIP or other technologies as well as data traffic.

In some situations, such as after being powered-on or at periodic intervals, the computing device 202 may use the location determination module 220 to determine a current location of the computing device 202 and set the mode 222 to either carrier mode (e.g., when the current location is in a service area of a carrier associated with the device number 226) or OTT mode (e.g., when the current location is outside a service area of a carrier associated with the device number 226).

The telephony client 216 may send a registration request 260 to register the computing device 202 with a local carrier's network. For example, the telephony client 216 may send the registration request 260 to the server 204 to register the computing device 202 with the local carrier associated with the network 206. The registration request 260 may indicate whether the computing device is registering in cellular mode (e.g., to use the cellular network 256) or OTT mode (e.g., to use the data network 258). In cellular mode, the computing device 202 may originate calls and terminate calls using the cellular network. In OTT mode, the computing device 202 may originate calls and terminate calls using the data network 258 (e.g., via VoIP).

When a user desires to originate a call using the computing device 202, the telephony client 216 may prompt the user to select (or enter) the destination number 228 (e.g., the destination of the call) and select (or enter) the originating number 230. The originating number 230 may default to the device number 226 and the user may override the default selection by selecting or entering one of the additional numbers 232. In another example, the originating number 230 may be determined from a user specified setting. In some configurations, the originating number 230 may default to a number stored with one or more contacts in an address book associated with a user. For example, the originating number 230 may be determined from an entry in the address book for the contact associated with the destination number.

The computing device 202 may send, to the server 204, a call request 262 that includes the device number 226, the destination number 228, and the originating number 230. The call request 262 informs the server 204 that a call will be placed from a device (e.g., the computing device 202) that is associated with the device number 226 to the destination number 228 and requests that the server 204 modify a call record associated with the call by using the originating number 230 as the caller identifier rather than the device number 228. The call record includes data associated with a call that is used within the network to route a call (and for billing purposes).

By using the originating number 230 as the caller identifier (e.g., instead of the device number 228) the call will appear to the person being called as originating from the originating number 230 rather the device number 228. For example, a user may use the user's personal phone (e.g., computing device) to place a call that appears to originate from the user's business (or other activity in which the user engages) rather than the user's personal phone. The user is thus able to keep the user's personal phone number private (e.g., because the caller identifier displayed to the called party is the originating number 230) while still making use of the user's personal phone to place calls for the user's business (or other activity). As another example, a spouse may use the user's computing device (e.g., phone) to place a call that appears to originate from the spouse's computing device rather than the user's computing device. For example, if the spouse's computing device is inoperable (e.g., dead battery etc.) or unavailable (e.g., spouse left it behind), the spouse can place calls using the user's computing device while the calls appear to originate from the spouse's computing device. In this way, family members can place calls from a single computing device while making the calls appear as if they were originating from the family member's computing device. As another example, an employee of a business may use their phone, or other computing device, to place a call that appears to originate from a line that appears to originate from the business.

After receiving the call request 262, the authentication module 254 may authenticate the call request 262 and determine whether the account associated with the device number is authorized to originate calls from the originating number 230. For example, the authentication module 254 may retrieve account information from the database(s) 250 to determine if the account associated with the device number 226 is authorized to originate calls from the originating number 230. When the account associated with the device number 226 is not authorized to originate calls from the originating number 230, the server 204 may send a message to the computing device 202 denying the call request 262. When the account associated with the device number 226 is authorized to originate calls from the originating number 230, the server 204 may create and send a temporary routing number (TRN) 266 to the computing device 202. In some cases, the routing module 252 may store at least a portion of the data associated with the call request 262 and the TRN 266 in the databases 250.

The computing device 202 may receive the TRN 266 and initiate the outgoing call 264. The outgoing call 264 may be made using the cellular network 256 when the computing device 202 is in cellular mode. The outgoing call 264 may be made using the data network 258 when the computing device 202 is in OTT mode. The TRN 266 is part of the signaling between the computing device 202 and the network 206 and may be sent via the data network 258. When the network 206 receives the outgoing call 264 with the TRN 266, the network 206 determines that special routing is to be used (e.g., because of the TRN), and routes the outgoing call 264 along with the TRN 266 to the routing module 252. In some cases, the routing module 252 may retrieve the data associated with the call request 262 and the TRN 266 from the databases 250. The routing module 252 may change the call record associated with the outgoing call 264 such that the outgoing call 264 appears to be originating from the originating number 230 rather than the device number 226. For example, the call record may identify the device number 226 as the number from which the outgoing call 264 is being placed. The routing module 252 may change the call record associated with the outgoing call 264 by substituting the originating number 230 for the device number 226 in the call record, making the outgoing call 264 appear to have been placed from a device associated with the originating number 230.

For billing purposes, either the device number 226 or the originating number may be billed for the outgoing call 264, depending on the carrier's policy, the user's account preferences, or both. For example, some carriers may charge the device number 226 and disregard the originating number 230, while other carriers may charge the originating number 230 and disregard the device number 226. As another example, some carriers may enable the user to select whether the device number 226 or the originating number is billed for the outgoing call 264.

Figure 3:
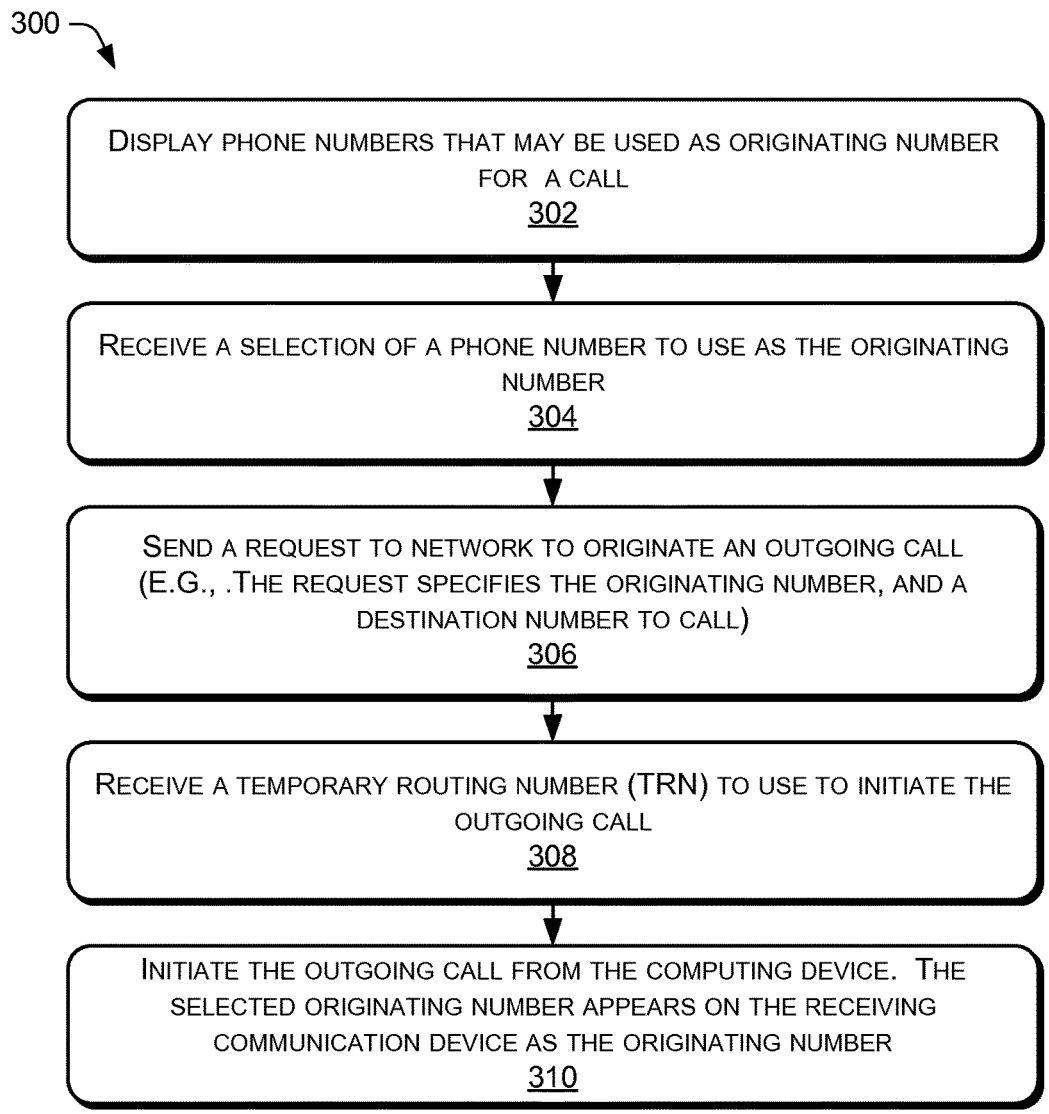
FIG. 3 is a flow diagram of an example process that includes using a selected number as the originating number for a call according to some implementations.
Figure 4:
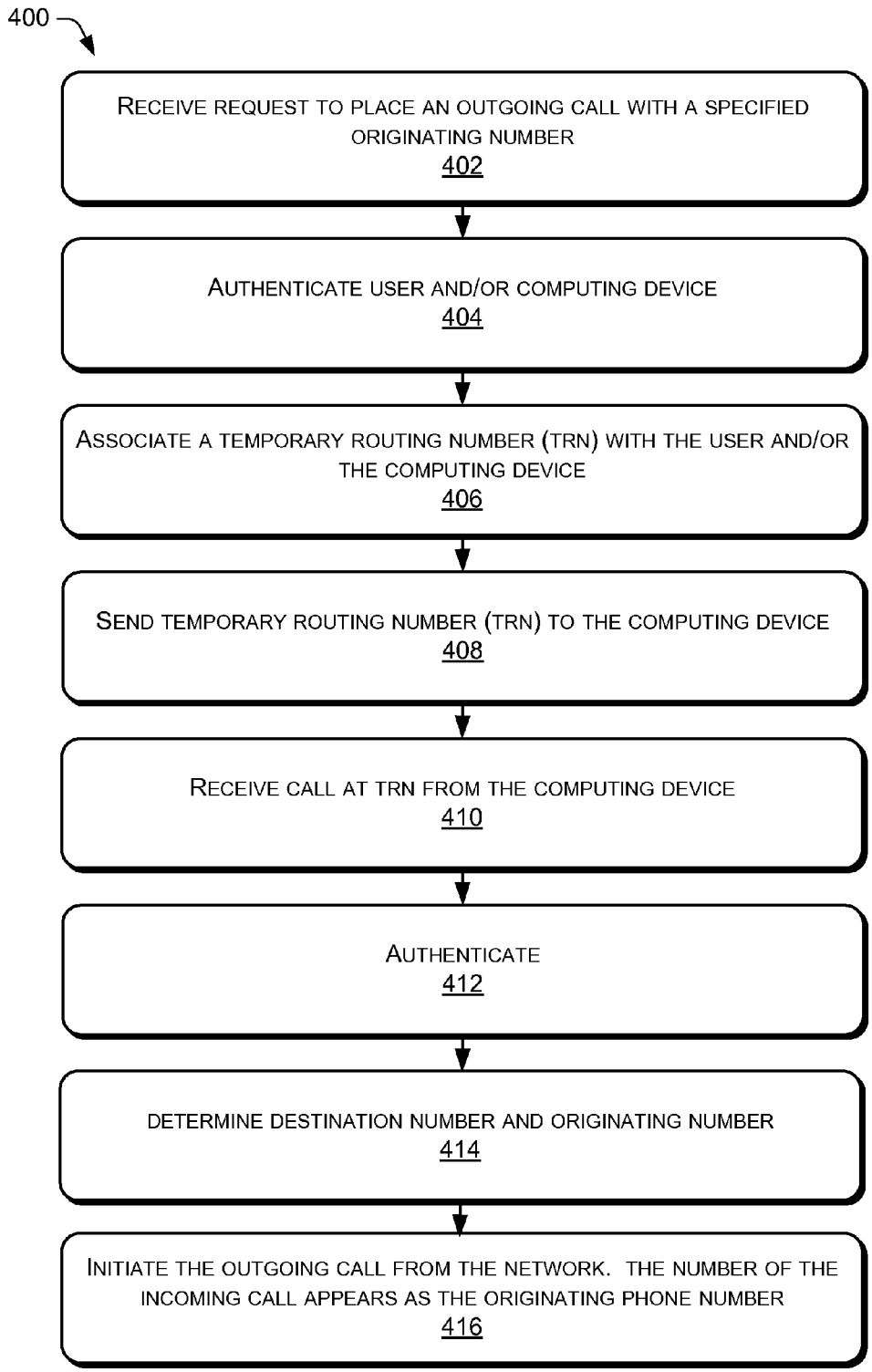
FIG. 4 is a flow diagram of an example process that includes a network using a selected number as the originating number for a call according to some implementations.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to the systems 100, 200, and 300, as described above, although other models, frameworks, systems and environments may implement these processes.

FIG. 3 is a flow diagram of an example process 300 that includes using a selected number as the originating number for a call according to some implementations. The process 300 may be performed by one or more computing devices, such as the computing devices described with regard to FIGS. 1-2.

At 302, phone numbers that may be used as the originating number for a call may be displayed. As discussed above, the originating number may be the device number that is associated with the computing device used to make the call, or may be a number that is associated with another computing device and/or user. For instance, the user may be authorized to use other numbers that are associated with family members, friends, business associations, and the like. In some examples, any user may authorize another user to use their telephone number. In other examples, a subscriber affiliated with a wireless network provider may authorize other subscribers of the wireless network provider to use one or more number affiliated with the subscriber.

At 304, a selection of a particular phone number to use as the originating number may be received. As discussed above, an application, such as the application 110, may be used to select the originating number to use when placing an outgoing call. In other examples, the user might use a voice interface to specify the originating number or specify the originating number using some other interface.

At 306, a request may be sent to the network to originate an outgoing call. In some examples, the request may specify the phone number associated with the computing device, (2) the originating phone number (e.g., the phone number that was previously selected at 304), and (3) a destination number that is to be called. For example, in FIG. 1, when a user desires to originate the outgoing call having the originating number "512-222-2222" that is different from the number associated with the device (e.g., the device number 226), the computing device may send the request to the network 102 requesting to use the selected number as the originating number.

At 308, a temporary routing number may be received by the computing device. As discussed above, the TRN may be provided by the network and be used by the computing device to initiate the call to the destination number. In some examples, when the originating number is the device number, the computing device may initiate the call directly to the destination number.

At 310, the outgoing call is initiated from the computing device to the TRN. Upon receiving the call at the TRN, the network calls the destination number using the specified outgoing number. The receiving computing device may display the originating number as specified by the user.

FIG. 4 is a flow diagram of an example process 400 that includes a network using a selected number as the originating number for a call according to some implementations. The process 400 may be performed by one or more computing devices, such as the computing devices described with regard to FIGS. 1-2.

At 402, a request to place an outgoing call with a specified originating number is received. As discussed above, a user may utilize the application 110, or some other interface, to specify an outgoing number to use when making an outgoing call to a destination number.

At 404, the user and/or computing device that is associated with the request to place the call may be authenticated. According to some configurations, the authentication includes determining that the user is authorized to use the selected outgoing number. In other examples, the authentication may include determining that the selected outgoing number is affiliated with the telecommunications network (e.g., is a number that is provided by the network).

At 406, a temporary routing number is associated with the user and/or the computing device that requested to place the outgoing call. As discussed above, the TRN may be any number that is available for use. Generally, the TRN will be used for a short duration (e.g., less than 30 seconds) for the computing device to contact the network and then released after the computing device is connected to the destination.

At 408, the temporary routing number is sent to the computing device requesting to place the outgoing call. As discussed above, the TRN may be sent to the computing device within a message that is received by the application 110.

At 410, a call is received from the computing device at the computing device where the temporary routing number is routed. For instance, the computing device may call the temporary routing number that was provided by the network in order to place an outgoing call to connect to the destination using the selected originating number.

At 412, an authentication of the user and/or the computing device may be performed. As discussed above, the authentication may include determining that the call is received by the computing device to which the TRN was sent and/or that the user is authorized to use the TRN to make the outgoing call.

At 414, the destination number and specified originating number may be determined. In some examples, one or more of the service nodes 106 may access a data store, or some other memory, to retrieve the specified originating number and destination number that was specified in the request to make the outgoing call.

At 416, the outgoing call may be initiated from the network. As discussed above, the network may call the destination number using the specified originating number as the calling number.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
   receiving, from a computing device, a request to initiate an outgoing call from a selected originating number to a destination number, the selected originating number different from a device number assigned to the computing device;
   sending, to the computing device, a temporary routing number;
   receiving, from the computing device, a call directed to the temporary routing number; and
   initiating the outgoing call to the destination number that originates from the selected originating number.

2. The computer-implemented method of claim 1, further comprising, authenticating the computing device to determine that the computing device is authorized to use the selected originating number for the outgoing call.

3. The computer-implemented method of claim 2, wherein the selected originating number is selected from telephone numbers associated with one or more other subscribers of a network.

4. The computer-implemented method of claim 1, wherein receiving the request to initiate the outgoing call is associated with a first subscriber of a wireless carrier and wherein the originating number is associated with a second subscriber of the wireless carrier.

5. The computer-implemented method of claim 1, further comprising, associating the temporary routing number with the selected originating number and the destination number.

6. The computer-implemented method of claim 5, further comprising, before initiating the outgoing call, determining the originating number to associate with the outgoing call using the temporary routing number.

7. A non-transitory computer-readable media storing computer-executable instructions that, when executed, cause one or more processors of a computing device to perform acts comprising:
   receiving, from a computing device associated with a wireless service provider, a request to place a call from an originating number to a destination number, the originating number selected from a list of numbers by a subscriber of the wireless service provider;
   providing, to the computing device, a temporary routing number associated with the wireless service provider;
   receiving, from the computing device, a call directed to the temporary routing number; and
   initiating the call from the originating number to the destination number.

8. The non-transitory computer-readable media of claim 7, wherein the originating number is associated with a first International Mobile Subscriber Identity (IMSI) that is different from a second IMSI assigned to a subscriber of the computing device.

9. The non-transitory computer-readable media of claim 7, further comprising, performing, at a computing device associated with the wireless service provider, an authentication to determine that a subscriber associated with the computing device is authorized to use the originating number.

10. The non-transitory computer-readable media of claim 7, wherein the numbers are associated with a single subscriber of the wireless service provider.

11. The non-transitory computer-readable media of claim 7, wherein receiving the request to place the call is associated with a first subscriber of the wireless service provider and wherein the originating number is associated with a first subscriber of the wireless service provider.

12. The non-transitory computer-readable media of claim 7, further comprising, storing the originating number and the destination number and associating the temporary routing number with the originating number and the destination number.

13. The non-transitory computer-readable media of claim 12, further comprising before initiating the call, retrieving the originating number and the destination number using the temporary routing number.

14. A device comprising:
   a display;
   one or more processors; and
   one or more memories storing instructions that, when executed by the one or more processors, perform acts including:
      displaying, on the display, phone numbers that are selectable as an originating number for a call;
      receiving a selected phone number from the phone numbers displayed;
      sending a request to a network associated with a wireless service provider to originate an outgoing call using the selected phone number as the originating number and receiving a temporary routing number in response to the request; and
      initiating the call to a destination number, the call using the selected phone number as the originating number.

15. The device of claim 14, wherein the phone numbers that are selectable as the originating number for the call include phone numbers associated with subscribers of a wireless service provider.

16. The device of claim 14, wherein initiating the call to the destination number comprises calling the temporary routing number.

17. The device of claim 14, wherein the acts further include determining the phone numbers that are selectable as the originating number for the call based, at least in part, on one or more authorizations of one or more subscribers to a wireless service provider.

18. The device of claim 14, wherein the selected phone number is associated with a first subscriber of a wireless service provider and the device is associated with a second subscriber of the wireless service provider.

19. The device of claim 14, wherein the selected phone number is associated with a first International Mobile Subscriber Identity (IMSI) that is different from a second IMSI associated with the device.

* * * * *